July 25, 1944.  C. OLDER  2,354,273
CAMERA
Filed Dec. 12, 1940
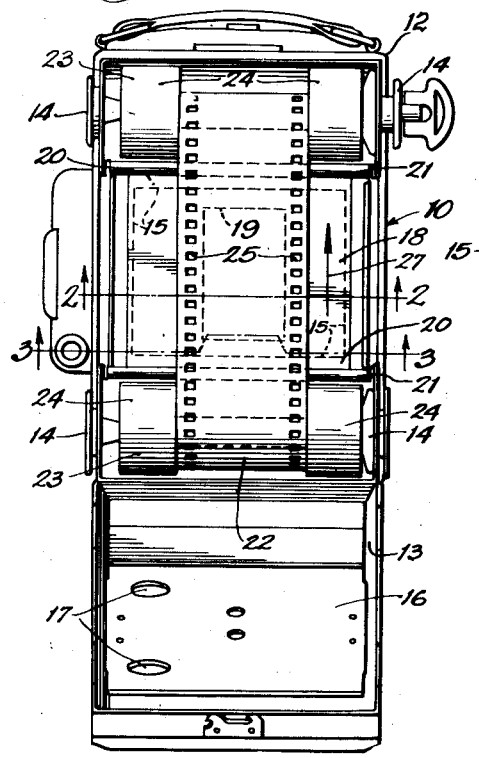
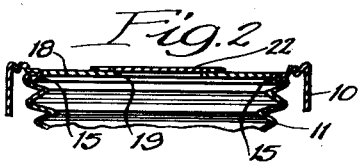
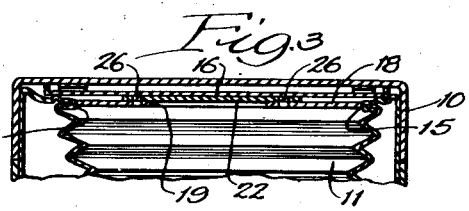
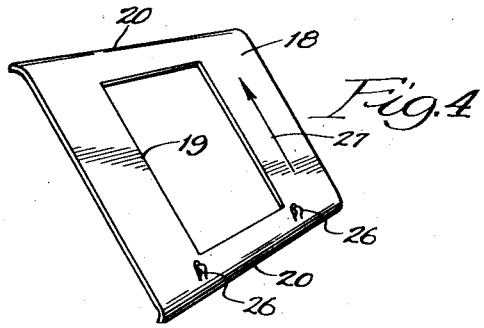
Inventor:
Clifford Older,
By McCaleb and Hendell
Attorneys.

Patented July 25, 1944

2,354,273

UNITED STATES PATENT OFFICE 2,354,273

CAMERA

Clifford Older, Wilmette, Ill., assignor of one-half to Albert G. McCaleb, Evanston, Ill.

Application December 12, 1940, Serial No. 369,727

4 Claims. (Cl. 116—114)

This invention relates to photographic cameras and has for its principal object the provision of an improved camera.

A further object of the invention is to provide an improved camera provided with means for indicating the position or extent of movement of a film therein.

A further object of the invention is to provide improved means for adapting a camera for taking of pictures with film of smaller size and at the same time to provide means whereby the position and degree of movement of the film is indicated audibly.

Other objects, advantages and capabilities of the invention will appear from the following description of preferred embodiments thereof taken in conjunction with the accompanying drawing in which:

Figure 1 is a rear view of a roll film camera embodying my invention, the back of the camera being swung into open position;

Figure 2 is a fragmentary sectional view, the section being taken on the line 2—2 of Figure 1;

Figure 3 is a similar view, the section being taken on the line 3—3 of Figure 1; and Figure 4 is a perspective view of an adapter plate provided in accordance with my invention.

Referring to the drawing, the reference numeral 10 designates generally a roll film camera of conventional type. This camera comprises a bellows 11, a main body 12, a back 13, and means designated by the reference numeral 14 for supporting and winding film spools.

A camera of this type is normally provided with a frame structure 15 which defines an opening within which the film is exposed. In the particular camera shown, the back 13 is provided with a presser plate 16 which serves to bear against the film and hold it against the frame 15.

The camera shown is provided with apertures 17 normally closed by red windows. Suitable indicia on the back of the paper carrying the film normally enables the user correctly to locate the film for successive exposures.

The description thus far is intended to describe a conventional roll film camera. Many people are in possession of cameras of this type, which are frequently equipped with remarkably good lenses. The devices of the present invention enable such a camera to be adapted for use with smaller films, for example, standard 35 millimeter film of the type extensively used at the present time for the production of colored pictures suitable for projection.

In accordance with the present invention, I provide an adapter plate 18 which is provided with an aperture 19 of desired length and of a width depending upon the width of the film to be used. The relation of the opening 19 with standard 35 millimeter film is shown in Figure 1.

The plate 18 is placed against the frame 15, its curved edges 20 being located on the inner side of the rollers 21 over which the film 22 moves in the manner shown in Figure 1. The curved edges 20 seat around the portions of the frame 15 which are adjacent the rollers 21.

I provide two spools 23 which are supported upon the supporting and winding members in conventional manner. These spools are, however, provided with enlarged ends 24 so that the distance between these ends is suitable for the reception of the film 22 of reduced width.

The length of the aperture 19, that is, its dimension in the roller-to-roller direction, corresponds to a definite number of times the spacing of the sprocket holes 25 in the film 22. Thus, as shown in Figure 1, the length of the aperture 19 is approximately that of eight sprocket perforations. Consequently, if the film is advanced through eight sprocket hole spacings, it will have moved to a new exposure position.

The change made in the size of the film renders it impossible to use the openings 17 for determining film position. In accordance with the present invention, the film position, or the displacement of the film, is indicated audibly by means which will now be described. In Figure 4 I have shown the plate 18 provided with resilient fingers 26 which are stamped out of the stock of the plate 18 and are directed rearwardly towards the presser plate 16 when the back of the camera is closed. Normally these fingers 26 bear against the presser plate 16.

The fingers 26 are located in alignment with the sprocket openings 25 on the film. Consequently, when the film is moved by winding, the fingers 26 have presented to them a series of sprocket openings 25. The spring through these openings then strikes the presser plate 16 in a manner which is distinctly audible from the exterior of the camera.

It will of course be understood that one finger 26 may be employed if desired. It will readily be understood that after the user has made an exposure, he actuates the winding mechanism 14 until he hears eight clicks, or, if he prefers, nine clicks. The user will then know that the film has been moved at least one full picture space.

It is to be noted that the fingers 26 are preferably located on the incoming side of the film 22, the direction of the film being indicated by an arrow 27 permanently located on the plate 18. They might of course be located on the outgoing side of the plate 18, or at an intermediate position thereof. Their preferred position, that is, the incoming side of the plate 18, has the definite advantage that if the user has heard the full number of clicks when he winds the film after an exposure, then he knows that he has new film completely over the aperture 19.

It is to be noted that the fingers 26 preferably extend in the same direction as the arrow at 27, that is, the direction in which the film moves. When the fingers are arranged in this way, the film cannot possibly snag upon the fingers 26.

It will be understood that when the camera is adapted for use with a smaller film, the apertures 17 are not used, and that they should be covered up by suitable closure means (not shown) such as opaque tape, to prevent fogging of films sensitive to the light which is normally transmitted by these apertures. If the camera is provided with a view finder, as is usual, the same must be replaced or modified, so as to correspond with the opening 19 instead of the opening defined by the frame 15. This change can readily be made by anyone skilled in the art.

Although the invention has been described in connection with the specific details of a preferred embodiment thereof, it must be understood that such details are not intended to be limitative of the invention, except insofar as set forth in the following claims.

Having thus described my invention, what I claim and desire to secure by Letters Patent of the United States is:

1. In a camera adapted to use film having sprocket openings along a side, in combination, means for moving said film within the camera, means defining a frame for the portions of the film being exposed, presser means for resiliently holding the film against said frame, and a resilient member carried by the frame defining means on the other side of the film from said presser means and in the path of said sprocket openings, said resilient member being arranged to snap through each sprocket opening, in series, as the film is moved, and to make audible contact with said presser means, thereby indicating the extent of the film movement.

2. In a film camera, in combination, means for windably supporting a film having a longitudinal regular series of openings, means defining a frame for a portion of film being exposed, an adapter plate supported on said frame defining a reduced exposure opening, presser means adapted resiliently to engage said film and hold same against said adapter plate, spools for said film having enlarged heads at each end whereby said film is supported in alignment with said reduced exposure opening, and sound-making means including a resilient member carried by said adapter plate in alignment with said series of openings and adapted to snap through said openings into audible engagement with said presser means as the film is moved to indicate audibly the displacement of said film.

3. In a film camera having means defining an exposure opening, means for moving a film across said opening thereby enabling a succession of exposures to be made thereon, and a member engaging a side of an edge of said film adjacent said exposure opening, the combination of a resilient member carried by the means defining the exposure opening in alignment with said edge of the film on the side thereof opposite said member, arranged to snap through openings in said edge of said film into audible contact with said member as the film is moved.

4. In a camera adapted to use film having sprocket openings along an edge, in combination, a plate defining an exposure opening, means for moving said film in contact with said plate and across said opening into a succession of exposure positions, a member on the other side of said film from said plate against which said edge of the film abuts and a resilient member carried by said plate in alignment with said edge normally biassed into engagement with said member whereby it snaps through said openings, as the film is moved within the camera, into audible engagement with said member to provide audible indication of the displacement of the film.

CLIFFORD OLDER.